United States Patent [19]

Davidson

[11] Patent Number: 5,237,512
[45] Date of Patent: Aug. 17, 1993

[54] SIGNAL RECOGNITION AND CLASSIFICATION FOR IDENTIFYING A FIRE

[75] Inventor: Ian Davidson, Lumphanan, Scotland

[73] Assignee: Detector Electronics Corporation, Minneapolis, Minn.

[21] Appl. No.: 798,040

[22] Filed: Nov. 20, 1991

Related U.S. Application Data

[63] Continuation of Ser. No. 440,684, Nov. 24, 1989, abandoned.

[30] Foreign Application Priority Data

Dec. 2, 1988 [GB] United Kingdom ............... 8828166

[51] Int. Cl.$^5$ ..................... G08B 17/12; G06F 15/74
[52] U.S. Cl. ..................................... 364/487; 340/578
[58] Field of Search ............... 364/487, 550, 505, 570; 382/22, 1; 340/577, 578

[56] References Cited

U.S. PATENT DOCUMENTS

| | | | |
|---|---|---|---|
| 4,152,642 | 5/1979 | Doherty | 324/77 A |
| 4,495,585 | 1/1985 | Buckley | 364/487 |
| 4,566,073 | 1/1986 | Zwicke | 364/431.02 X |
| 4,783,833 | 11/1988 | Kawabata et al. | 382/22 |
| 4,796,205 | 1/1989 | Ishii et al. | 364/550 |
| 4,797,936 | 1/1989 | Nakatsugawa et al. | 364/487 |
| 4,800,285 | 1/1989 | Akiba et al. | 340/578 X |
| 4,803,469 | 2/1989 | Matsushita | 340/577 |
| 4,884,222 | 11/1989 | Nagashima et al. | 364/550 |
| 4,904,986 | 2/1990 | Pinckaers | 340/578 |
| 4,907,281 | 3/1990 | Hirvonen et al. | 382/22 |
| 4,924,417 | 5/1990 | Yuasa | 364/550 |
| 4,951,234 | 8/1990 | Bellows | 364/550 |
| 4,970,660 | 11/1990 | Marchant | 364/570 |
| 4,983,853 | 1/1991 | Davall et al. | 340/578 X |
| 5,006,710 | 4/1991 | Powell | 340/578 X |

FOREIGN PATENT DOCUMENTS

| | | |
|---|---|---|
| 3421782 | 12/1985 | Fed. Rep. of Germany. |
| 1279029 | 1/1970 | United Kingdom. |
| 1377683 | 12/1974 | United Kingdom. |
| 2007000 | 5/1979 | United Kingdom. |
| 2145864 | 4/1985 | United Kingdom. |

*Primary Examiner*—Thomas G. Black
*Assistant Examiner*—Michael Zanelli
*Attorney, Agent, or Firm*—Palmatier, Sjoquist & Helget

[57] ABSTRACT

An apparatus and method for sensing electro-magnetic radiation and analysing the resultant electrical signal waveform, in order to determine whether the radiation originates from a fire condition, monitors variations in the signal waveform over a predetermined period of time. The amplitudes of the successive transitions in the waveform and the elapsed time between the transitions are measured. Two two-dimensional matrices are produced. The first of these is made up of a plurality of co-ordinate points each corresponding to a respective pair of successively occurring signal transitions. The position of each such point in the matrix is dependent on the respective amplitudes of the two transitions making up each pair. The second matrix is also made up of a plurality of co-ordinate points each corresponding to a respective pair of the signal transitions. In the second matrix, however, the position of each point within the matrix depends on the amplitude excursion and the elapsed time between the two transitions of each pair. The matrices thus produced are compared with predetermined matrices corresponding, for example, to predetermined fire conditions or false alarm conditions, whereby to determine whether the sensed radiation has a pattern corresponding to a fire or a false alarm situation.

7 Claims, 5 Drawing Sheets

SIGNAL RECOGNITION AND CLASSIFICATION FOR IDENTIFYING A FIRE

This is a continuation of U.S. application Ser. No. 07/440,684, filed Nov. 24, 1989, now abandoned.

BACKGROUND OF THE INVENTION

This invention relates to a recognition system for use in classifying phenomena involving complex waveforms.

One field of application for the invention is fire detection, and the invention will be described herein principally in that context but by way of example only.

Fire detectors based on the radiation emitted by combustion products are known. These are commonly tuned to a particular narrow band of the electromagnetic spectrum. It has been found however that such detectors give poor discrimination between false alarms and genuine fires.

One object of the invention is to provide a recognition system which can provide a high degree of accuracy in distinguishing fires from other events causing the emission of radiation.

SUMMARY OF THE INVENTION

The invention accordingly provides apparatus for recognition and classification, comprising a sensor for detecting a parameter of interest and providing an electrical signal representative thereof, calculating means arranged to derive from said signal at least one matrix representing transitions of the signal waveform, memory means storing reference matrix values of the parameter of interest, and means for comparing the signal matrix and the reference values.

The calculating, memory and comparing means may suitably be provided by a micro-computer.

From another aspect, the invention resides in a method of recognition and classification of phenomena involving complex waveforms, the method comprising detecting a waveform of interest, identifying transitions in said waveform, deriving a matrix of values related to said transitions as a representation of said waveform, and comparing said matrix with stored reference values.

The matrix may be (1) a matrix of amplitude excursion between transitions with time between transitions, or (2) amplitude at transition with amplitude at next transition. Either or, preferably, both of these may be derived and compared with respective reference values.

BRIEF DESCRIPTION OF THE DRAWINGS

An embodiment of the invention will now be described, by way of example only, with reference to the drawings, in which.

DESCRIPTION OF THE PREFERRED EMBODIMENT

Figure 1:
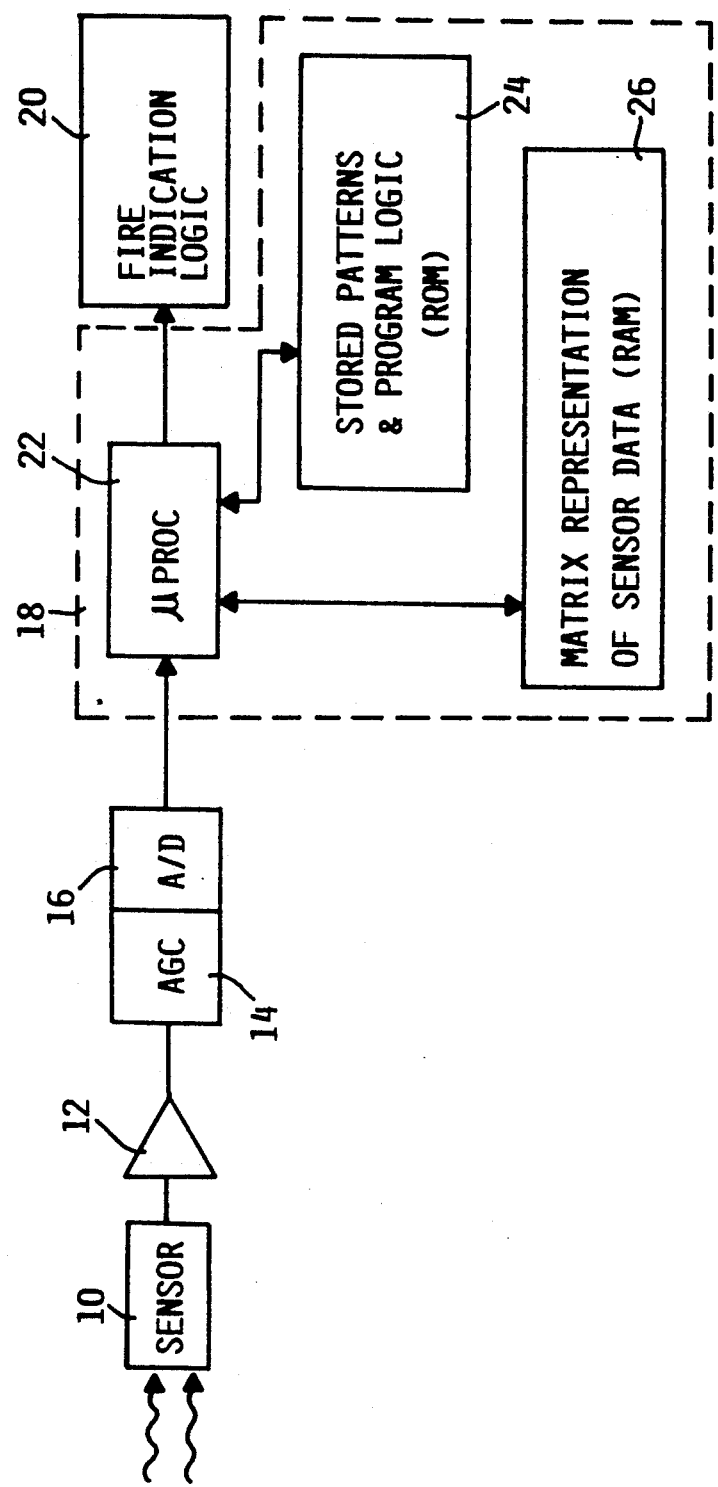
FIG. 1 is a block diagram of apparatus embodying the invention.

Referring to FIG. 1, a fire detection system comprises a radiation sensor 10 which may suitably be a broadband detector for visible, infrared or ultraviolet light. The output of sensor 10 is amplified at 12 and passed via an automatic gain control circuit 14 to an A-to-D converter 16. The resulting digitized signal is analyzed (as will be described by microcomputer 18) if this results in recognition of a fire, an alarm signal of any convenient type is generated at 20.

Figure 2:
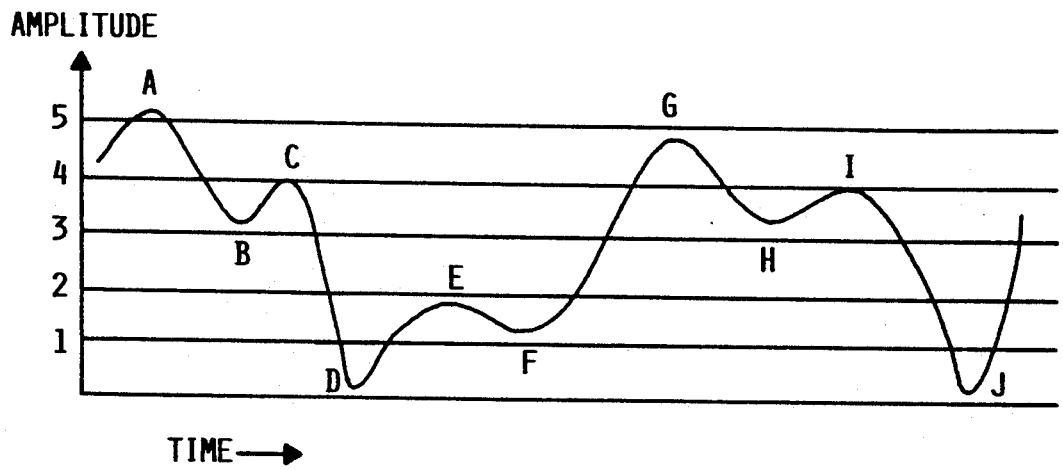
FIG. 2 is a graphical representation of a signal detected in the apparatus of FIG. 1.

The output signal from the sensor 10 will be a relatively complex waveform, part of which is shown in FIG. 2. The invention is based on deriving from the waveform one or more matrices, each representating in a simple manner information providing a significant characterization of the waveform which can then be compared with a reference.

Figure 3:
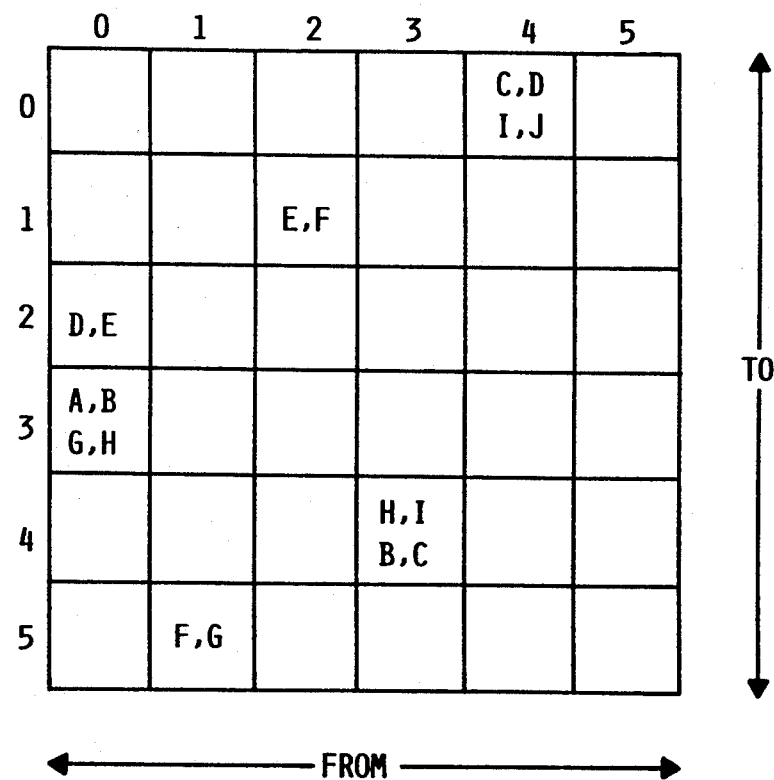
FIG. 3 is a graphical representation of a transition matrix derived from the signal of FIG. 2.

FIG. 3 shows a "transition matrix" of the waveform of FIG. 2. This is formed by detecting the transitions or the turning points A-J of the waveform and measuring the amplitude of each, in the example shown to a resolution of five amplitude levels. The matrix is then created representing the change in amplitude between successive transitions as a 2-dimensional matrix with axes defining the start and finish amplitudes of that change. For example, between C and D the amplitude changes from 4 units to 0 units, and the step C, D is positioned to define "from 4" (horizontal axis) "to 0" (vertical axis).

Figure 4:
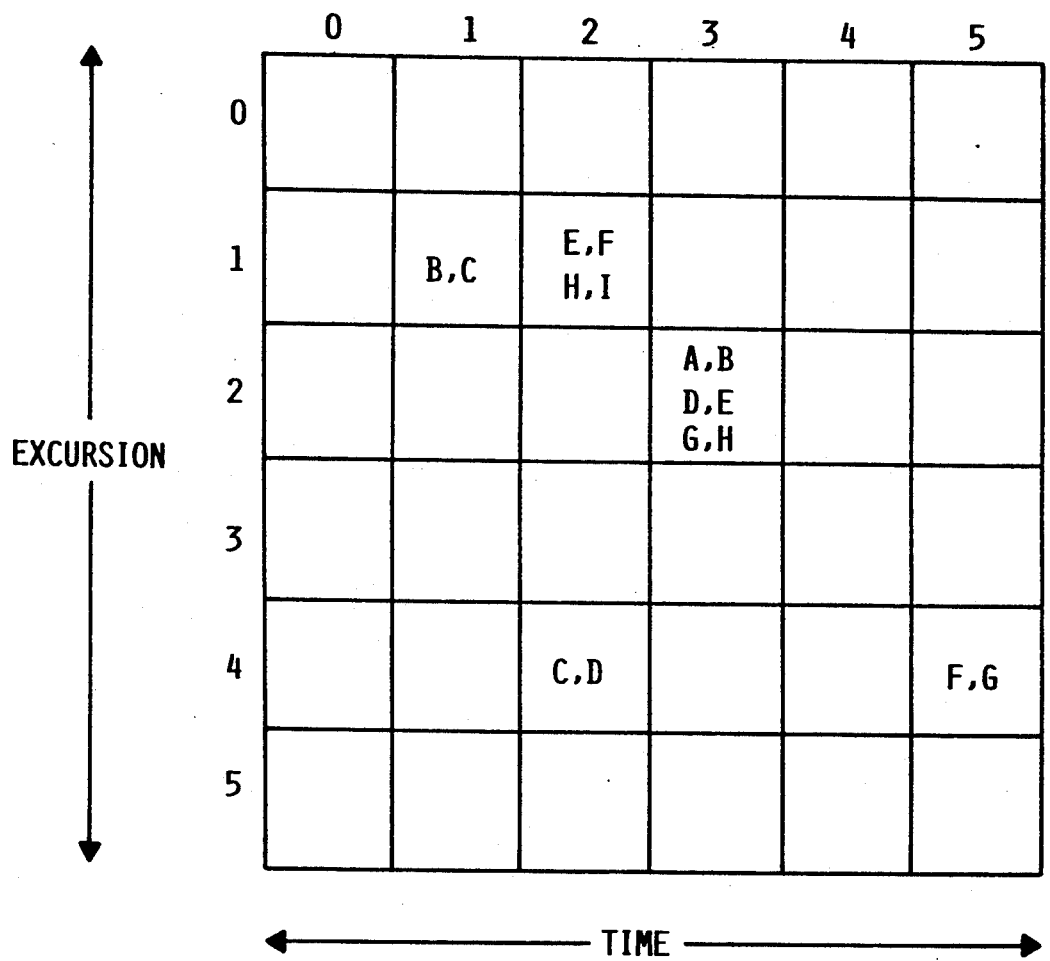
FIG. 4 is a graphical representation of a signal reversal matrix derived from the signal of FIG. 2.

The matrix of FIG. 3 is thus descriptive of the varying absolute amplitudes of the signal in a time-independent manner. FIG. 4 illustrates a "signal reversal" matrix for the same signal, which is descriptive of change (but not absolute value) of amplitude with time. Here again, the matrix is based on detecting signal transitions and their amplitudes, but the elements of the matrix are the amplitude excursion and the time between transitions. Thus, for example, between F and G the excursion (vertical axis) is 4 units and the time (horizontal axis) 5 units.

The matrices may readily be derived from the digitized detected signal by the microcomputer 18, which comprises microprocessor 22, ROM 24, and RAM 26, by appropriate software within the routine competence of a person of ordinary skill in the art.

In use, a given period of sensor signal is digitized and converted into matrix form on a repetitive basis. Each matrix is stored in RAM 26, and the microprocessor 22 then operates to compare the matrix with a reference held in ROM 24. Suitable reference patterns can be developed for loading in ROM 24 by empirical methods, specifically by using a similar sensor and associated equipment to derive matrices from actual fires and actual false-alarm-inducing phenomena. If a predetermined relationship exists between a sensor matrix and a reference matrix, an alarm indication is produced.

Figure 5:
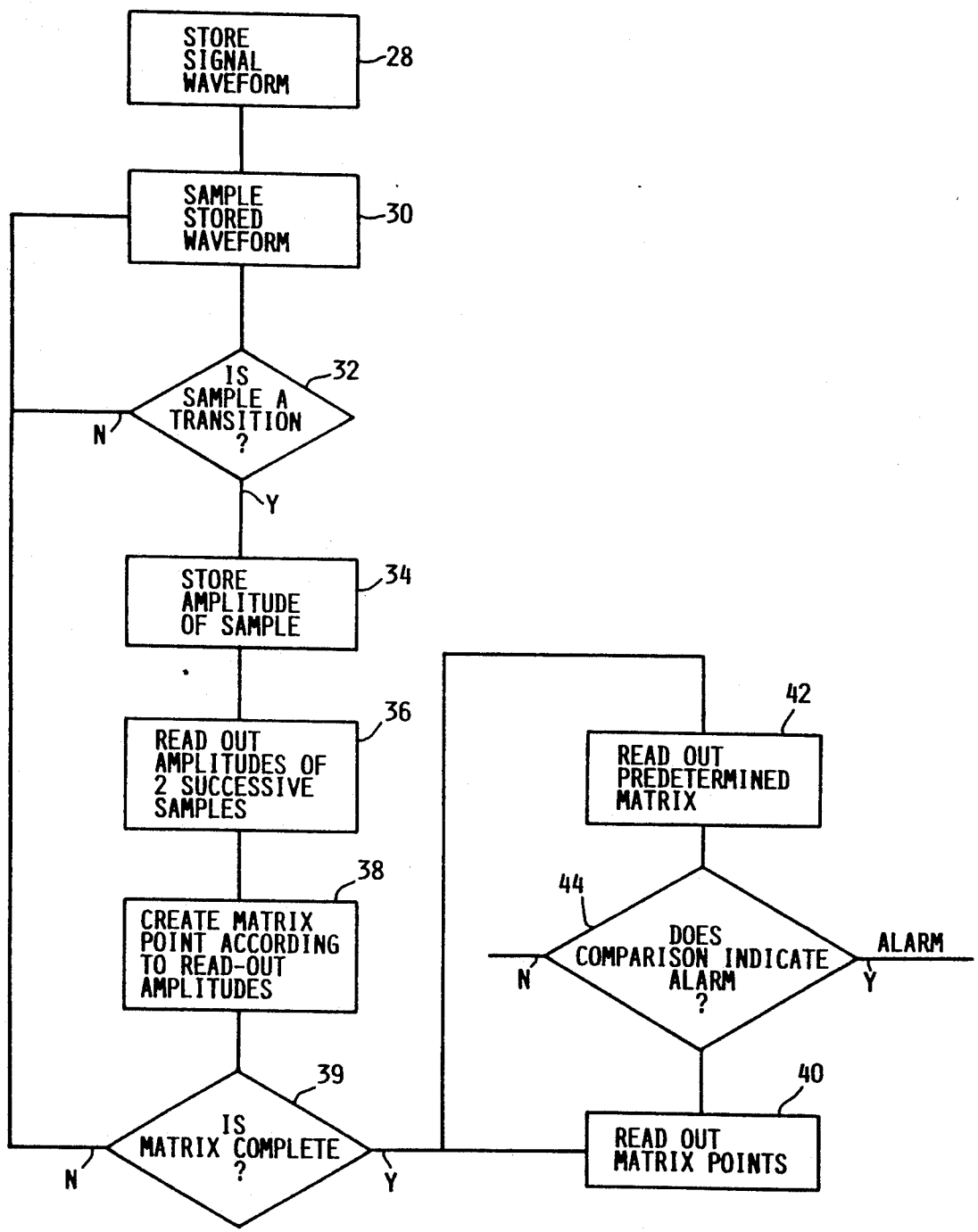
FIG. 5 is a flow chart for explaining the generation of the matrix illustrated in FIG. 3.

FIG. 5 is a flow chart which shows how the microprocessor 22 may operate to produce the matrix shown in FIG. 3. At block 28, the microprocessor 22 stores a given period of the sensor signal in digital form. At block 30, the digital waveform is sampled. At block 32, the sample is tested to check whether it represents a transition of the waveform. This may be done using a known standard technique for this purpose, such as comparing the sample value with the value of the immediately preceding sample. If the answer to the question "Is sample a transition?" is "no", the loop repeats from block 30 and tests the next sample. If the answer is "yes", the amplitude of the sample is measured and stored at block 34. At block 36, the microprocessor reads out the stored amplitude values of the first two successive stored samples. These are then stored in RAM 26, according to their relative values, so as to create a point in the matrix. This is illustrated at block 38. The microprocessor then checks whether the matrix is complete (block 39). If it is not, the waveform is sampled again (block 30) to intiate the process of producing the next matrix point. If the matrix is complete, it is read out (block 40) together with a reference matrix (block 42) stored in ROM 24. The matrices are then compared (block 44). If the comparison step indicates that a predetermined relationship exists between the sensor matrix and the reference matrix, an alarm is produced.

Figure 6:
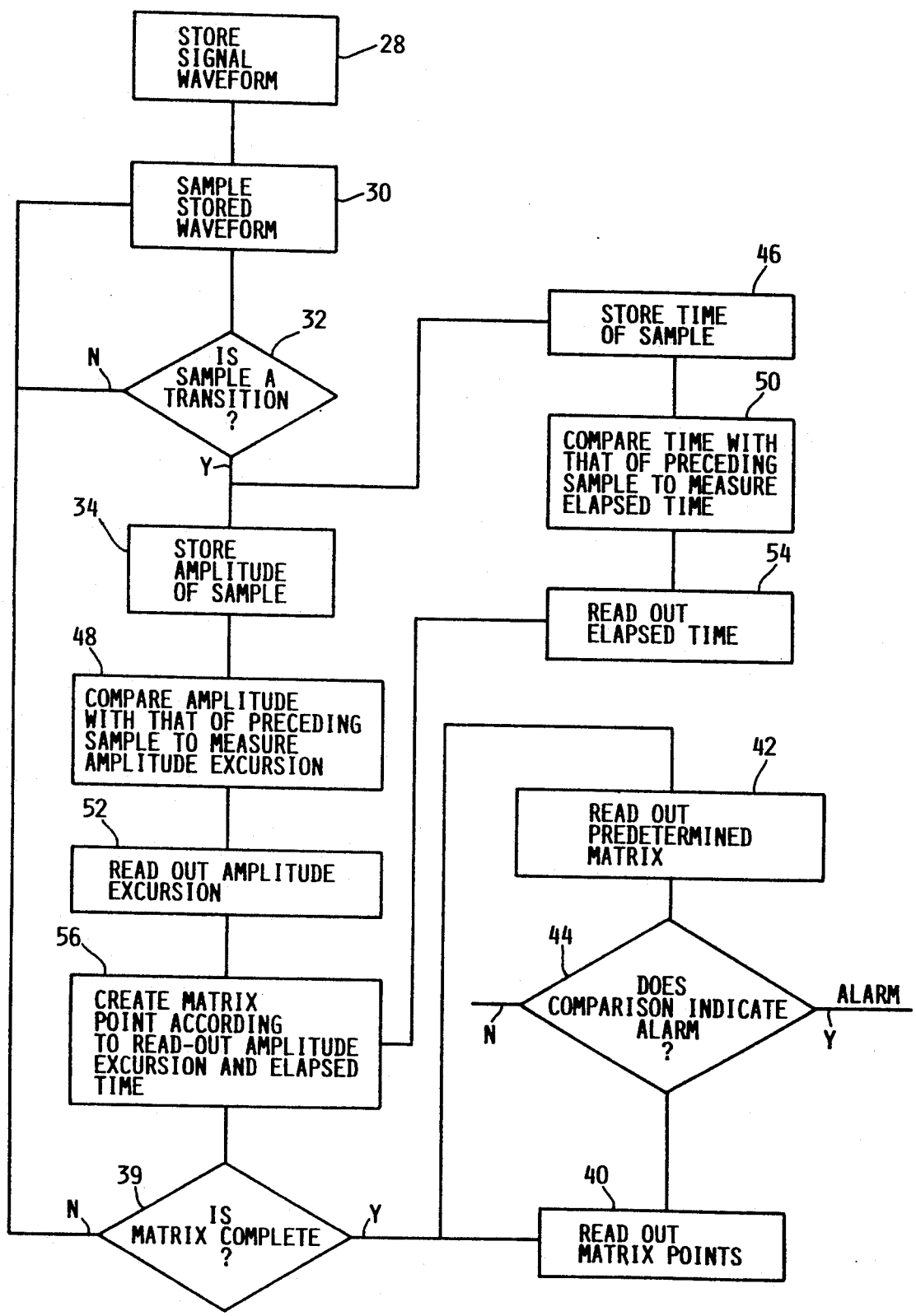
FIG. 6 is a flow chart for explaining the generation of the matrix illustrated in FIG. 4.

FIG. 6 is a flow chart for explaining how the matrix of FIG. 4 is produced. In FIG. 6, blocks 28, 30, 32 and 34 correspond to those blocks in FIG. 5. If the answer to the question "Is sample a transition?" (block 32) is "yes", the amplitude of the transition is stored (block 34) and so is its time of occurrence (block 46). At block 48, the amplitude of each stored transition sample is compared with the amplitude of the immediately previous stored transition sample to produce a value representing the amplitude excursion between the two samples. Similarly, at block 50 the time of occurrence of each stored transition sample is compared with that of the immediately previous stored transition sample to produce the elapsed time between the two samples. At blocks 52 and 54, the amplitude excursions and the elapsed times between successive transitions are read out and stored in RAM 26, their relative values being used to create (block 56) a particular point in the matrix (FIG. 4). As described with reference to FIG. 5, a check is made (block 39) whether the matrix is complete and, if not, the loop repeats from block 30 until the matrix is complete. This matrix and the reference matrix are then read out (blocks 40 and 42) and compared (block 44). If a predetermined relationship exists between the sensor matrix and the reference matrix, an alarm indication is given.

Modifications and refinements to the handling of the matrix information may be made particularly with the use of neural network pattern recognition systems. The two types of matrix described above may each be derived and compared with respective references, and the results of the two comparisons combined to give an overall probability. It is also possible to use auto-correlation, i.e., comparing the sensor signal with a delayed version of itself, to establish the degree of periodicity in the sensor signal as an auxiliary false alarm indication, a high degree of periodicity being associated with a false alarm situation. Although described above with specific reference to fire detection, the invention may be applied to recognition of other complex variable phenomena, such as explosion detection, transient analysis, and monitoring the condition of machinery.

Other modifications may be made within the scope of the invention.

What is claimed is:

1. Apparatus for the recognition and classification of electromagnetic radiation from a source, for detecting whether the source is a fire comprising sensor means responsive to the electromagnetic radiation for producing an electrical signal waveform in dependence on the electromagnetic radiation, means for detecting and measuring values relating to any successive amplitude transitions of the electrical signal waveform during a predetermined period of time, means responsive to the means for detecting and measuring, for generating a two-dimensional signal amplitude matrix made up of a plurality of co-ordinate points each dependent on the measured values relating to a respective pair of successively occurring said amplitude transitions and each of whose positions within the matrix is dependent on those measured values, means for prestoring at least one predetermined signal amplitude matrix representative of electromagnetic radiation from a known source, means for comparing such generated matrix with said at least one predetermined signal amplitude matrix for classifying the electromagnetic radiation producing the electrical signal waveform from which the matrix has been generated, and alarm means responsive to said means for comparing, for generating an alarm when said means for comparing classifies the electromagnetic radiation as electromagnetic radiation from a source of fire.

2. Apparatus for the recognition and classification of electromagnetic radiation from a source, for detecting whether the source is a fire, comprising sensor means responsive to the electromagnetic radiation for producing an electrical signal waveform in dependence on the electromagnetic radiation, means operative to detect any successive amplitude transitions of the electrical signal waveform during a predetermined period of time and to measure the amplitude change of the electrical signal waveform between successive amplitude transitions and the time separation between successive amplitude transitions, means responsive to the measured amplitude changes and the measured time separations for generating a two-dimensional signal amplitude matrix made up of a plurality of co-ordinate points each corresponding to a respective pair of successively occurring said amplitude transitions and each of whose positions within the matrix is dependent on the respective measured amplitude change and measured time separation between the two amplitude transitions in the pair, means for prestoring at least one predetermined two-dimensional signal amplitude matrix, means for comparing such generated matrix with said at least one predetermined two-dimensional signal amplitude matrix for classifying the electromagnetic radiation producing the electrical signal waveform from which the generated matrix has been generated, and means responsive to said means for comparing, for signaling an alarm when said means for comparing classifies the electromagnetic radiation as electromagnetic radiation from a fire source.

3. A method for the recognition and classification of electromagnetic radiation from a source, for detecting whether the source is a fire, comprising the steps of sensing the electromagnetic radiation to produce an electrical signal waveform in dependence on the electromagnetic radiation, detecting any successive amplitude transitions of the electrical signal waveform during a predetermined period of time and measuring the amplitude values of the electrical signal waveform at each of the transitions, generating a two-dimensional signal amplitude matrix made up of a plurality of co-ordinate points each corresponding to a respective pair of successively occurring amplitude transitions and each of whose positions within the matrix is dependent on the respective measured amplitude values of the two transitions in the pair, constructing at least one predetermined two-dimensional signal amplitude matrix representative of a signal waveform from a known condition of fire, comparing such generated matrix with said at least one predetermined matrix for classifying the electromagnetic radiation producing the electrical signal waveform from which the generated matrix has been generated, and indicating an alarm when the classified electromagnetic radiation is indicative of a fire.

4. A method for the recognition and classification of electromagnetic radiation from a source, for detecting whether the source is a fire, comprising the steps of sensing the electromagnetic radiation to produce an electrical signal waveform in dependence on the electromagnetic radiation, detecting any successive amplitude transitions of the electrical signal waveform during a predetermined period of time and measuring the amplitude change of the electrical signal waveform between successive amplitude transitions and measuring the time separation between successive amplitude transitions, generating a two-dimensional signal amplitude matrix made up of a plurality of co-ordinate points each corresponding to a respective pair of successively occurring amplitude transitions and each of whose positions within the matrix is dependent on the respective measured amplitude change and measured time separation between the two amplitude transitions in the pair, constructing at least one predetermined two-dimensional signal amplitude matrix representative of a signal waveform from a known condition of fire, comparing such generated matrix with said at least one predetermined matrix for classifying the electromagnetic radiation producing the electrical signal waveform from which the matrix has been generated, and generating an alarm when the classified electromagnetic radiation is indicative of a fire.

5. Apparatus for detecting whether a source of electromagnetic radiation is a fire, comprising sensor means responsive to the electromagnetic radiation from the source to produce an electrical signal waveform varying in amplitude in dependence on the variation of the detected electromagnetic radiation, waveform transition detecting means connected to receive the electrical signal waveform and operative to detect any successive transitions of the electrical signal waveform and to measure the amplitude value of the electrical signal waveform at each such transition, first recording means operative to record the change in amplitude value between each transition and the next succeeding transition for storing a first set of amplitude changes corresponding to a predetermined time portion of the electrical signal waveform, second recording means operative to store at least one predetermined, second, set of amplitude changes between the successive transitions of an electrical signal waveform corresponding to the variations of electromagnetic radiation derived from a predetermined source of electromagnetic radiation, comparing means operative to compare the first stored set of amplitude changes with the said at least one second stored set of amplitude changes, and output means responsive to the comparison carried out by the comparing means to determine whether the source sensed by the sensing means is a fire and to produce an output indication accordingly.

6. Apparatus according to claim 5, in which the first recording means comprises means recording, for each pair of succeeding transitions in the electrical signal waveform produced by the sensor means, the value of the signal amplitude at the first of each pair of transitions and the value of the signal amplitude at the second transition of the pair.

7. Apparatus for detecting whether a source of electromagnetic radiation is a fire, comprising sensor means responsive to the electromagnetic radiation from the source to produce an electrical signal waveform varying in amplitude in dependence on the variation of the detected electromagnetic radiation, waveform transition detecting means connected to receive the electrical signal waveform and operative to detect any successive transitions of the electrical signal waveform and to measure the amplitude value of the electrical signal waveform at each such transition and the time separation of the transitions, first recording means operative to record the changes in amplitude value between each transition and the next succeeding transition for a predetermined time portion of the electrical signal waveform for storing to store a first set of amplitude changes and the corresponding time separations, second recording means operative to store at least one predetermined, second set, of amplitude changes, and the corresponding time separations, of an electrical signal waveform corresponding to the variations of electromagnetic radiation derived from a predetermined source of electromagnetic radiation, comparing means operative to compare the first stored set of amplitude changes and corresponding time separations with the said at least one second stored set of amplitude changes and corresponding time separations, and output means responsive to the comparison carried out by the comparing means to determine whether the source sensed by the sensing means is a fire and to produce an output indication accordingly.

* * * * *